(12) United States Patent
Tseng et al.

(10) Patent No.: US 9,859,727 B2
(45) Date of Patent: Jan. 2, 2018

(54) BATTERY CHARGER DEVICE AND METHOD

(71) Applicants: Justin Tseng, Taipei (TW); Ben Lin, Taipei (TW); Zachary Joseph Zeliff, Taipei (TW); Yueh Hua Li, Taipei (TW); Dyson Lin, Taipei (TW); Simon Ho, Taipei (TW); Tk Kao, Taipei (TW); Wen Wu, Taipei (TW)

(72) Inventors: Justin Tseng, Taipei (TW); Ben Lin, Taipei (TW); Zachary Joseph Zeliff, Taipei (TW); Yueh Hua Li, Taipei (TW); Dyson Lin, Taipei (TW); Simon Ho, Taipei (TW); Tk Kao, Taipei (TW); Wen Wu, Taipei (TW)

(73) Assignee: Adonit Co., Ltd., Taipei (TW)

( * ) Notice: Subject to any disclaimer, the term of this patent is extended or adjusted under 35 U.S.C. 154(b) by 155 days.

(21) Appl. No.: 14/751,121

(22) Filed: Jun. 25, 2015

(65) Prior Publication Data

US 2015/0380961 A1 Dec. 31, 2015

Related U.S. Application Data

(60) Provisional application No. 62/017,243, filed on Jun. 25, 2014.

(51) Int. Cl.
H02J 7/00 (2006.01)
(52) U.S. Cl.
CPC .......... H02J 7/0042 (2013.01); H02J 7/0034 (2013.01)

(58) Field of Classification Search
CPC .............................. H02J 7/0042; H02J 7/0034
USPC .......................................................... 320/107
See application file for complete search history.

(56) References Cited

U.S. PATENT DOCUMENTS

| | | | | |
|---|---|---|---|---|
| 5,854,551 | A * | 12/1998 | Lilja | H02J 7/0031 320/163 |
| 5,909,100 | A * | 6/1999 | Watanabe | H02J 7/025 320/108 |
| 6,112,414 | A * | 9/2000 | Andis | B26B 19/3826 30/231 |
| 6,134,612 | A * | 10/2000 | Bailey | G06F 1/1632 710/2 |
| 6,905,367 | B2 * | 6/2005 | Crane, Jr. | H01R 13/514 439/607.01 |
| 8,044,640 | B2 * | 10/2011 | Cruise | H02J 7/022 320/137 |
| 9,169,626 | B2 * | 10/2015 | Guler | E03D 3/06 |
| 9,391,464 | B2 * | 7/2016 | Choi | H02J 7/0006 |
| 9,438,054 | B2 * | 9/2016 | Patel | H02J 7/0052 |
| 9,496,726 | B2 * | 11/2016 | Frid | H02J 7/0021 |
| 2004/0113589 | A1 * | 6/2004 | Crisp | H02J 7/0006 320/128 |
| 2006/0152191 | A1 * | 7/2006 | Lee | H02J 7/0006 320/106 |

(Continued)

Primary Examiner — M'Baye Diao

(57) ABSTRACT

Embodiments of a battery charger and methods for operating same are disclosed. The charger has a plurality of charging pins, and a device to be charged may be plugged into the charger in multiple orientations. The charger detects the device's orientation and sets the states of its charging pins appropriately to charge the device. Optionally, the charger may have additional pins, likewise settable according to a device's orientation, for supplying power and/or communications to the device during charging.

6 Claims, 7 Drawing Sheets

(56) References Cited

U.S. PATENT DOCUMENTS

| | | | | |
|---|---|---|---|---|
| 2008/0164841 A1* | 7/2008 | Nam | ............... | H02J 7/0045 |
| | | | | 320/110 |
| 2010/0317233 A1* | 12/2010 | Koh | ............... | H01R 13/22 |
| | | | | 439/626 |
| 2011/0095722 A1* | 4/2011 | Chang | ............... | H02J 7/0055 |
| | | | | 320/107 |
| 2014/0225568 A1* | 8/2014 | Chung | ............... | H02J 7/0031 |
| | | | | 320/112 |
| 2015/0194833 A1* | 7/2015 | Fathollahi | ............... | H02J 7/0044 |
| | | | | 320/114 |
| 2016/0204816 A1* | 7/2016 | Abramovich | ............... | H04B 1/3888 |
| | | | | 455/575.8 |

\* cited by examiner

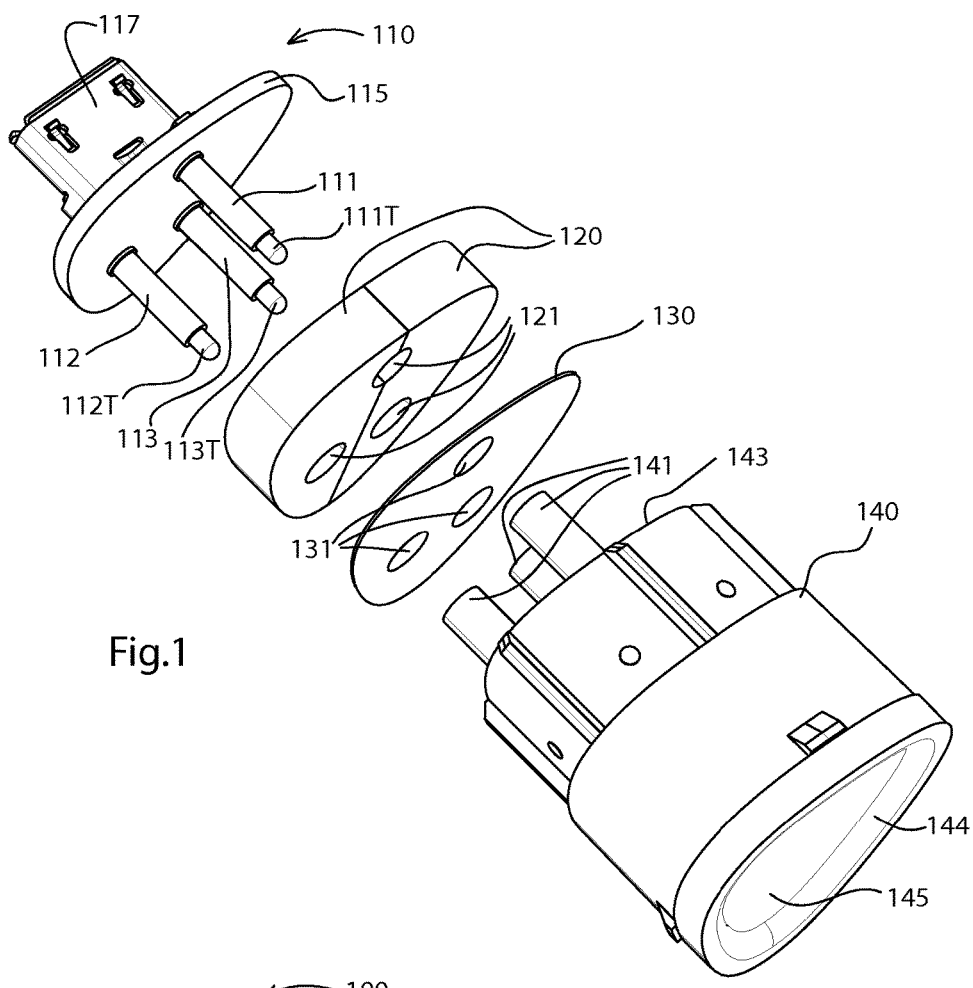
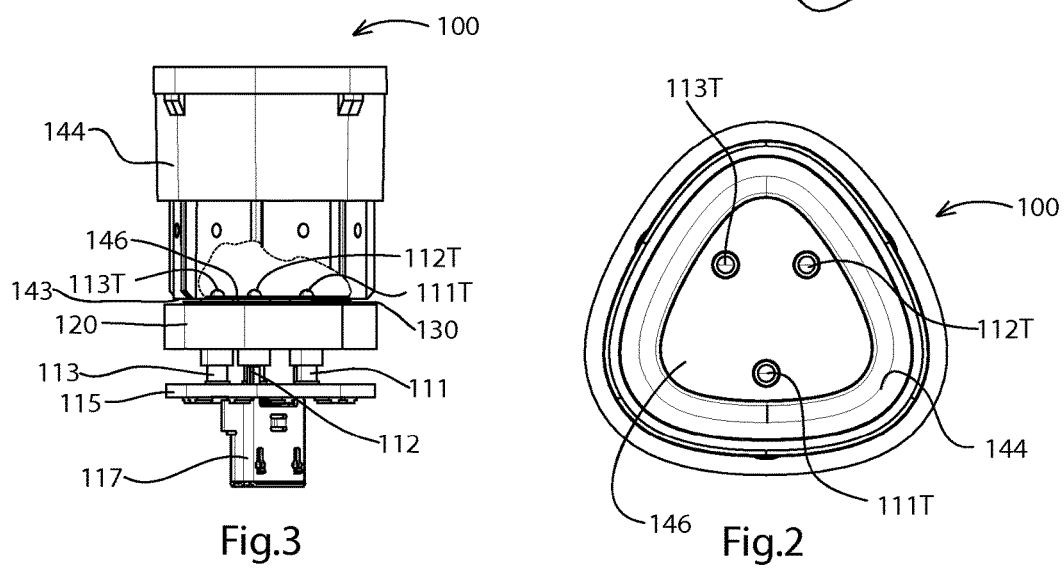
Fig.1
Fig.3
Fig.2

BATTERY CHARGER DEVICE AND METHOD

CROSS REFERENCE TO RELATED APPLICATIONS

This application claims the benefit of priority to U.S. provisional patent application No. 62/017,243, filed Jun. 25, 2014, and entitled "BATTERY CHARGER DEVICE AND METHOD", the disclosure of which is hereby incorporated by reference in its entirety.

FIELD OF THE DISCLOSURE

This disclosure relates to battery chargers, and more specifically to battery chargers which have an arrangement of charging connections to which devices can be coupled in multiple orientations.

SUMMARY OF THE PRIOR ART

As more energy-dense battery chemistries have been developed, batteries have become increasingly sensitive to improper charging. Batteries can become damaged or even catch fire if improperly charged, and so "intelligent" battery chargers now monitor the battery during charging to ensure that it is charged safely. It is important that the battery and charger be connected in the correct polarity; reversing the connection drains the battery instead of charging it, which can rapidly damage or destroy the battery. This becomes more complicated when batteries are integrated into devices where, for example due to design aesthetics, the charger connection can be connected in multiple orientations. A smart charger that detects device orientation and charges a device accordingly is therefore desirable.

SUMMARY OF CERTAIN ASPECTS OF THE EMBODIMENTS

Embodiments of a charger to which a device can be connected in any orientation, and which then detects device orientation and sets its charging pin orientation according to the orientation of the device, are disclosed. In some embodiments, the device may be magnetically attracted to the charger.

Embodiments of methods for operating the charger are also disclosed.

BRIEF DESCRIPTION OF THE DRAWINGS

FIG. 1 is an exploded view of a charger;
FIG. 2 is an end view of a charger;
FIG. 3 is an assembled view of a charger with a cutaway to show the charging pins in the charger's interior.

DETAILED DESCRIPTION OF THE EMBODIMENTS

Figure 4:
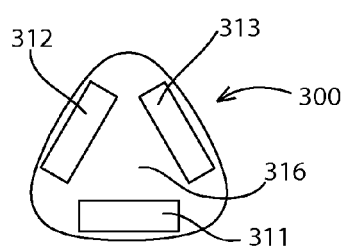
FIG. 4 is an end view of a device with charging contacts.

The following detailed description of embodiments references the accompanying drawings that form a part hereof, and in which are shown by way of illustration various illustrative embodiments through which the invention may be practiced. The embodiments are described in sufficient detail to enable those skilled in the art to practice the invention, and it is to be understood that other embodiments may be utilized and that logical changes may be made without departing from the spirit and scope of the invention. The detailed description is, therefore, not to be taken in a limiting sense, and the scope of the invention is defined solely by the appended claims.

Beginning with the physical design of an embodiment of a charger, please refer to FIG. 1, an exploded view of some components of a charger, in conjunction with FIG. 2, an end view of the proximal end of a charger, and FIG. 3, a side view of a partially assembled charger showing a cutaway through a side of the charger for convenience in viewing the interior. The charger 100 has a circuit assembly 110, an optional magnet 120 and optional adhesive pad 130, and a body 140. The body 140 has a cavity 145 into which an end of a device can fit, surrounded by a wall 144 which may optionally be shaped to align the device's charging contacts against the charger's contacts, the device optionally being urged against the charger's charging pins by magnetic attraction from the magnet 120 on ferromagnetic material comprised by the device. A plurality of hollow tubes 141 extend substantially in parallel distally from the outer rear surface 143 of the body 140. The adhesive pad 130 may be shaped to conform to the shape of the magnet 120; in this example embodiment, the adhesive pad 130 has a plurality of holes 131 positioned so that the adhesive pad 130 can slide onto the rear of the body 140. Likewise, in this example embodiment, the magnet 120 has a plurality of holes 121 positioned so that the magnet can slide over the plurality of hollow tubes 141 and rest adjacent to the rear of the body 140, adhered in place against the body 140 by the adhesive pad 130. The magnet 120 may optionally be made in multiple segments for convenience. The physical design of the charger, in some embodiments, leaves a gap between the magnet 120 and the circuit assembly 110 to allow for air circulation for cooling of the circuit and to provide a buffer space to avoid damage to the electronic components in case of physical shock or electrical conductance by the magnet.

The circuit assembly 110 has an electrical connector 117 on the distal side of a circuit board 115; the electrical connector 117 is electrically coupled to a charging circuit (not shown) on the circuit board 115. In some embodiments, the electrical connector 117 is a USB connector, for example a USB mini type B plug or jack, either four position or five position, or a USB 2.0 micro type B plug or jack, or a USB micro-AB jack. On the proximal side of the circuit board 115, a plurality of charging pins 111,112,113 extend substantially parallel to each other. Although three pins are shown as an example, more can be used; please see discussion of FIGS. 11-18 below. The charging pins are arranged in a pattern exhibiting partial symmetry around a point, such that a device being charged is capable of contacting them in two or more orientations; in some embodiments, the charging pins are arranged substantially near the vertices of a regular polygon; in some embodiments, the charging contacts are arranged substantially near the vertices of an equilateral triangle; in some embodiments, the charging contacts are arranged substantially near the vertices of an isosceles triangle. The charging pins 111,112,113 optionally have spring-loaded tips 111T,112T,113T, allowing the tips to adjust automatically in the event that a device to be charged is positioned askew or has charging contacts that are at slightly different heights. The charging pins 111,112,113 conform in layout to the plurality of hollow tubes 141 of the body 140 and are sized to fit inside the plurality of hollow tubes 141 such that the tips 111T,112T,113T extend above the inner rear surface 146 of the body 140.

Figure 5:
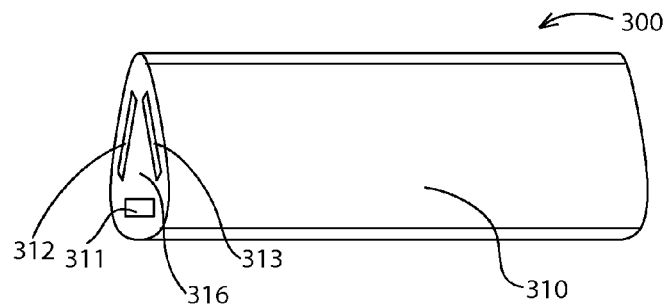
FIG. 5 is a perspective view of a device with charging contacts.
Figure 6:
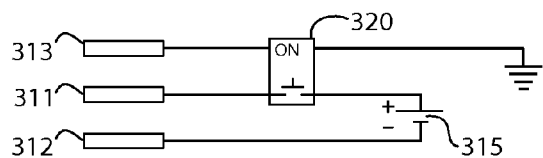
FIG. 6 is a block functional diagram of a portion of the device with charging contacts.

Please refer to FIG. 4, a view of an end of a device with charging contacts, in conjunction with FIG. 5, a perspective view of the device with charging contacts, and FIG. 6, a block functional diagram of a portion of the device's circuitry. The device 300 has charging contacts 311,312,313 arranged around an end of the device 300; the charging contacts 311,312,313 in some embodiments are arranged substantially symmetrically around a point. The charging contacts 311,312,313 may optionally be made of a ferromagnetic metal so that they will be attracted to a magnet in a charger. The charging contacts 311,312,313 are each different: positive contact 311, negative contact 312, and trigger contact 313 each have separate functions. Positive contact 311 and negative contact 312 are electrically coupled to an internal battery 315 inside device 300, and current flowing through these contacts can charge the battery. Trigger contact 313 is used to indicate to the charger the orientation of the charging contacts 311,312,313; the relative layout of the charging contacts 311,312,313 is known at the time of manufacturing, and all devices 10 can be manufactured with the same relative orientations of the charging contacts, thereby allowing detection of the trigger contact 313 to indicate to a charger the positions of the positive contact 311 and negative contact 312. Trigger contact 313 is also used by the charger to set the device 300 into charging mode; by having trigger contact 313 electrically coupled to switch 320, the charger can apply a voltage to trigger contact 313 to set switch 320 to the "on" state, thereby putting device 300 into charging mode and allowing power to flow from the charger through the positive contact 311 to the battery 315, while also decoupling the device's circuitry (not shown). When switch 320 is not in the "on" state, no power can flow and the battery and device circuitry are therefore protected.

Figure 7:
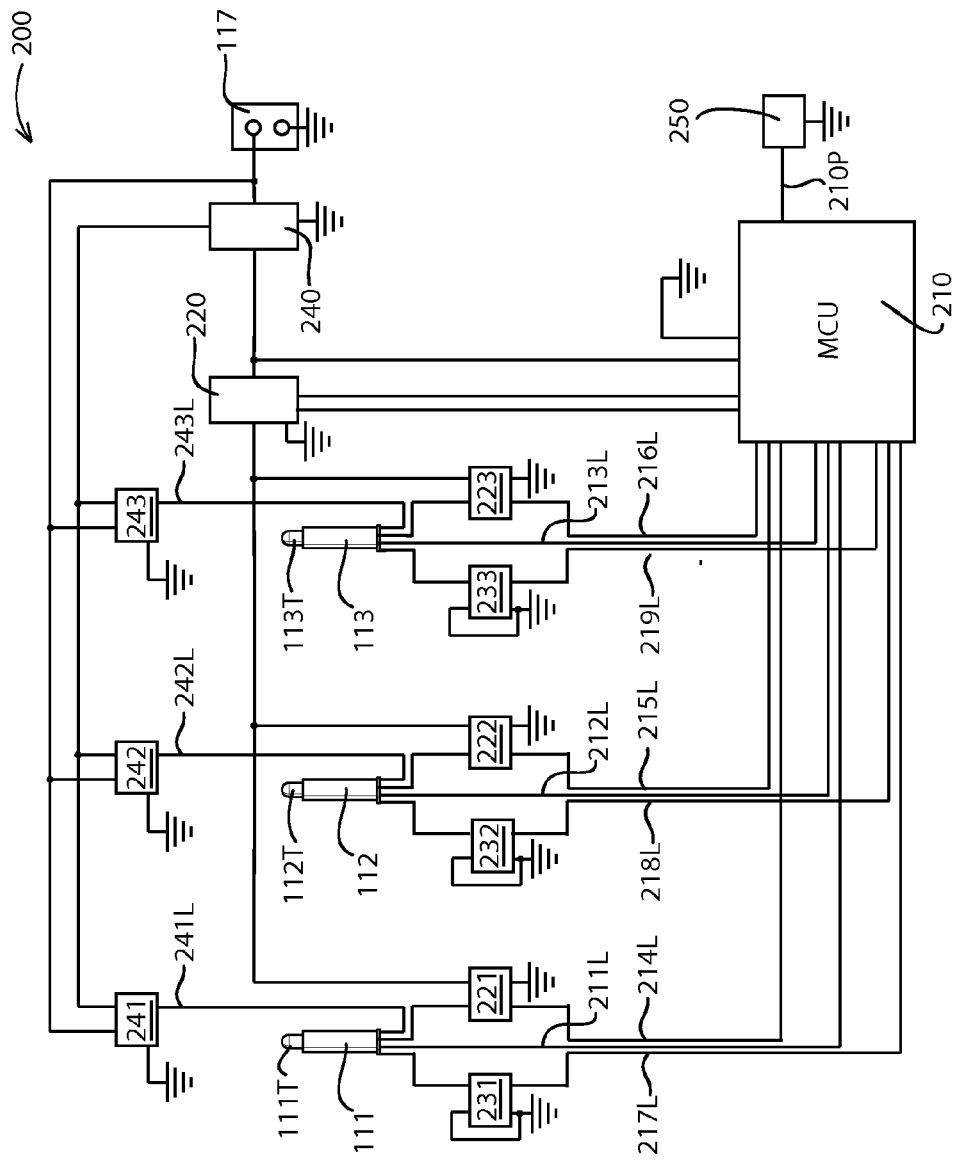
FIG. 7 is a block diagram of a circuit for the charger.
Figure 8:
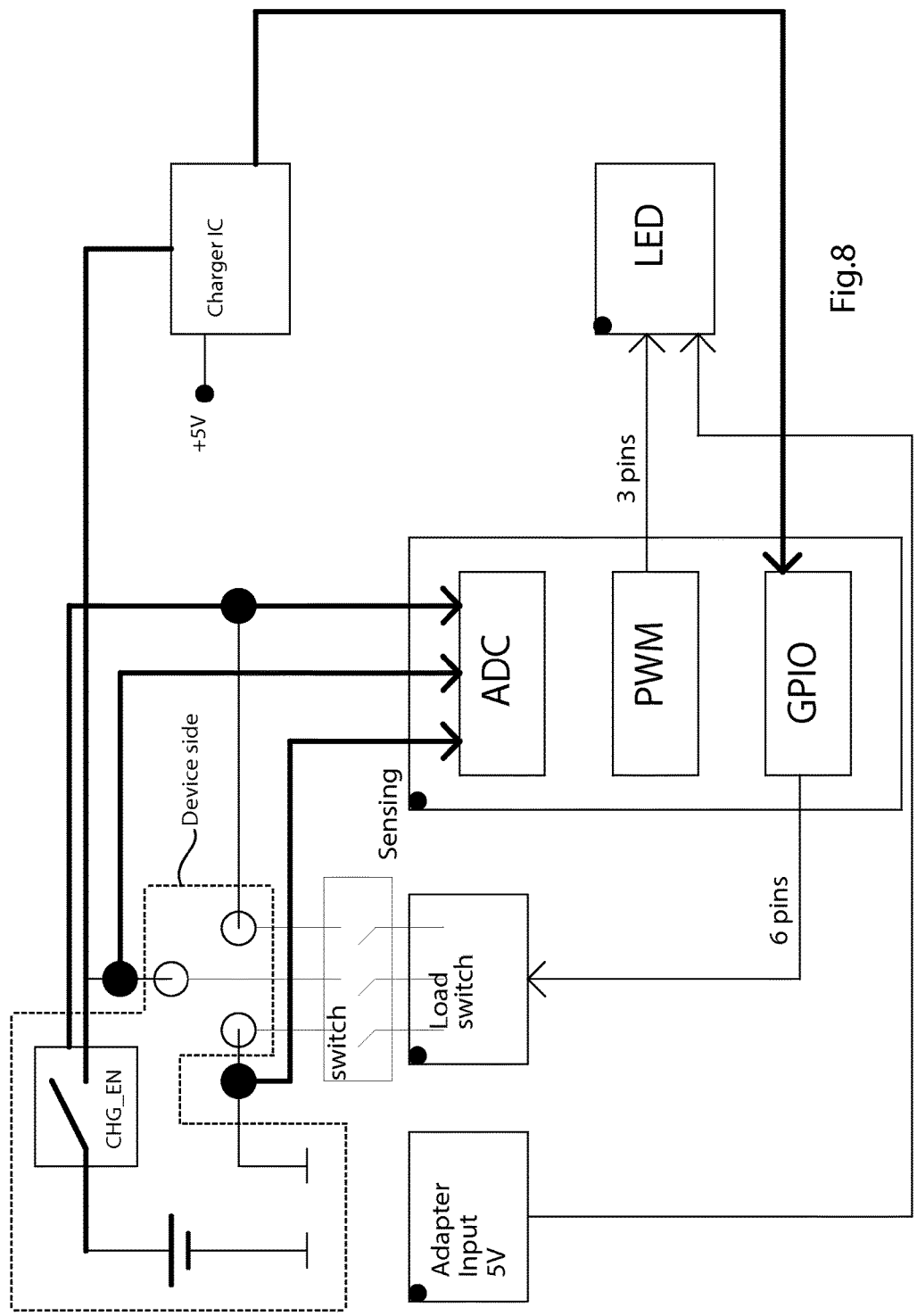
FIG. 8 is a block functional diagram of a circuit for the charger.

FIG. 7 shows a block diagram of a circuit for an embodiment of a charger, while FIG. 8 shows a high-level block diagram of the charger and relevant portions of the device. In FIG. 8, the portions of the diagram that refer to the device are contained within the dashed line labeled "Device side". The circuit 200 comprises a microcontroller (MCU) 210, a power-on-reset (POR) circuit 240, and a charge controller 220. The POR circuit 240 is electrically coupled to the power plug 117, and the POR controller 240 helps to control voltage surges during plugging in and unplugging the power cord (not shown). The POR circuit 240 is in turn electrically coupled to the MCU 210 and the charge controller 220, as well as to a plurality of power-on-reset load switches 241, 242,243. The POR circuit 240 thus supplies power to the circuit as a whole, conditioning power during transitions. The power-on-reset load switches 241,242,243 are also electrically coupled to charging pins 111,112,113 respectively by control lines 241L,242L,243L respectively. The charge controller 220 is in signal communication with the MCU 210 on two control lines to inform the MCU of charging status information. The MCU 210 has at least one PWM output 210P which is electrically coupled to a LED 250; the LED 250 can thus be used to indicate to a user the charge state of the battery, charging status of the charger, and/or an error state of the charger. The charging pins 111,112,113 are electrically coupled to GPIO control lines 211L,212L,213L of the MCU 210 as well as to a first plurality of load switches 221,222,223 and a second plurality of load switches 231,232,233. The first plurality of load switches 221,222,223 are also electrically coupled to the MCU 210 by GPIO control lines 214L,215L,216L respectively for controlling the load switches, and are used to control power flow from a voltage source that can be used to charge the battery, by electrically coupling positive voltage from the voltage source to one charging contact of the plurality of charging contacts 111,112,113; the selected charging contact will be the one that is electrically coupled to the positive terminal of the battery. The second plurality of load switches 231,232,233 are also electrically coupled to the MCU 210 by GPIO control lines 217L,218L,219L respectively for controlling the load switches, and are used to control power flow to ground, and electrically couple ground to the negative terminal of the battery during charging.

When powered on and coupled to a device, the MCU 210 scans the charging pins 111,112,113 to determine which pin is electrically coupled to the trigger contact 313 of device 300. When the MCU determines which charging pin of the plurality of charging pins is electrically coupled to the trigger contact 313, its code determines which of the control lines and hence load switches it should turn on in order to supply charging current and/or data communications to the appropriate pins of the device. For example, when charging pin 111 is electrically coupled to trigger contact 313, the charger is programmed to know that charging pin 112 is electrically coupled with positive charging contact 311 and charging pin 113 is electrically coupled with negative charging contact 312, and the charger shall set load switches 222 and 233 on, in order to couple the negative charging contact 312 to ground and the positive charging contact 311 to positive voltage. If, on the other hand, charging pin 112 is determined to be electrically coupled to trigger contact 313, then the charger sets load switches 223 and 231 on, thus electrically coupling ground to charging pin 111 and positive voltage to charging pin 113; and on the third hand, if charging pin 113 is determined to be coupled to trigger contact 313, then the charger sets load switches 221 and 232 on, thus electrically coupling ground to charging pin 112 and positive voltage to charging pin 111.

Figure 9:
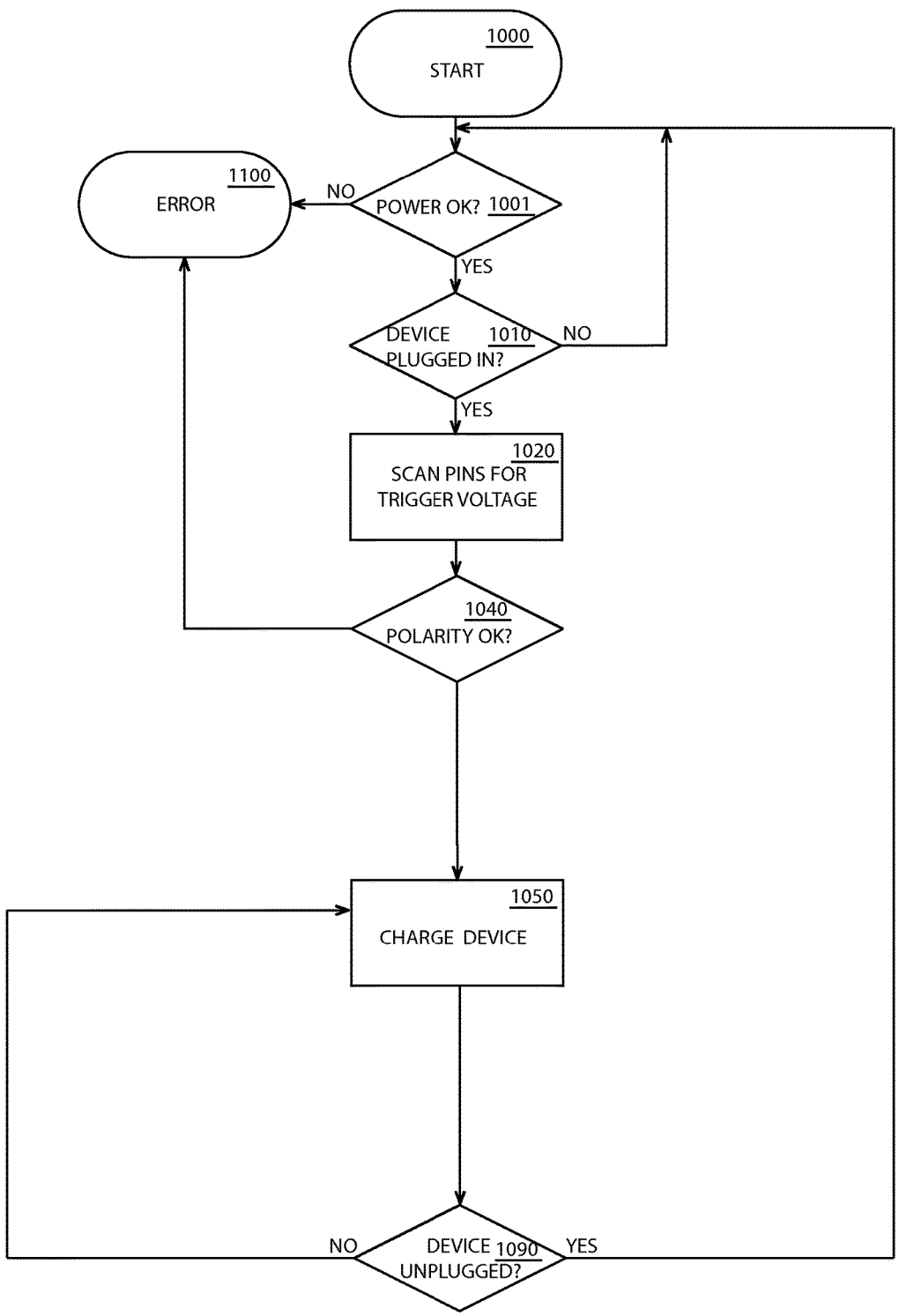
FIG. 9 is a flowchart of a method for operating a battery charger.
Figure 10:
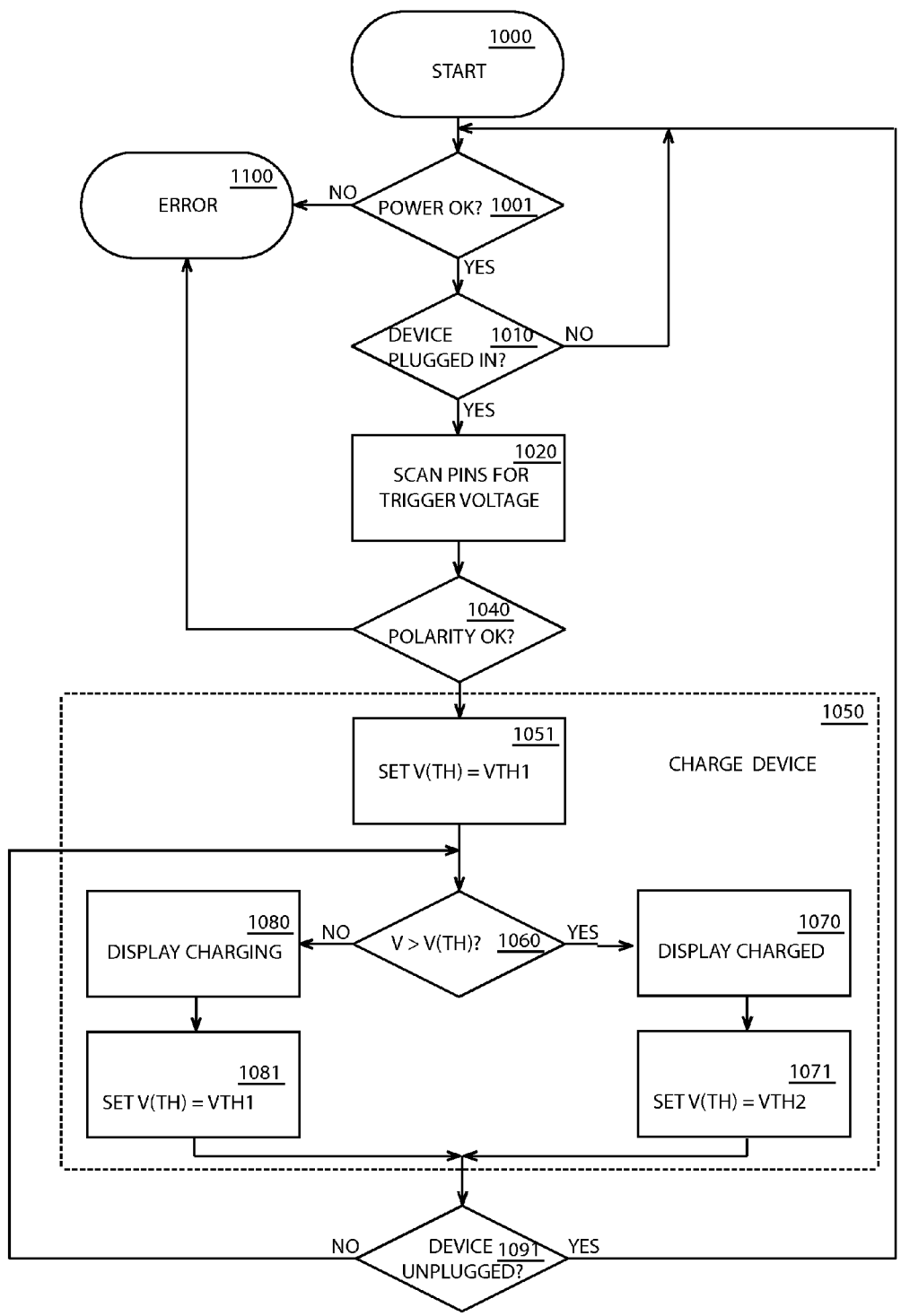
FIG. 10 is a flowchart of a method for operating a battery charger.

Refer now to FIG. 9, a method for operating a charger, and FIG. 10, a method for operating a charger. Upon being connected to a power source, the method 1000 enters step 1001, in which the power source is evaluated for voltage and steadiness. When the evaluation fails, then the method goes to step 1100, an error state, in which an indication of error is shown; for example, the charger may have an LED which shows a red blinking light. When the evaluation succeeds, then the method goes to step 1010.

In step 1010, when no plugged-in device is detected, the method returns to step 1001; when a plugged-in device is detected, the method proceeds to step 1020. By looping through the power source evaluation step 1001 repeatedly, power source reliability can be continuously monitored and reported to the user until such time as the charger is charging a device.

In step 1020, the charger sequentially scans each charging pin in its plurality of charging pins to see which charging contact is electrically coupled to a trigger pin. The charger has already detected, in the previous step, that a device has been coupled to it for charging. The charger now loops through all pins, sampling each pin for a voltage within a predetermined voltage range to determine whether a charging pin is electrically coupled to the trigger pin; in some embodiments, the voltage range is the range from about 1.5V to 2.5V. When a voltage within the range is detected, the charger marks a charging pin as a candidate. Only one charging pin should be marked in any sample round. When five polarity samples in a row are found to have the same pin selected, the method continues to step 1030. If fewer than five polarity samples in a row have the same pin selected, the method continues to step 1100 to indicate an error. This helps to ensure that a battery will not be reverse-charged or otherwise improperly charged.

In step 1040, a final test is performed on polarity. Once the charger pin that is electrically coupled to the trigger pin has been identified, the plus and minus pins are expected to be in fixed positions relative to the trigger pin. To ensure that the battery is not backwards in the circuit or has not become otherwise damaged, the polarity is checked to ensure that the charger sees a positive voltage at the charger pin that is supposed to be electrically coupled to the positive contact, and to ensure that the charger sees a negative voltage at the charger pin that is supposed to be electrically coupled to the negative contact. If either is incorrect, the method continues to step 1100, the error state. If both are correct, the method continues to step 1050.

At step 1050, the charger charges the device. The charger periodically proceeds to step 1090, for example every millisecond.

In step 1090, the charger tests to see if the device being charged has been unplugged. If the device is still plugged in, the method continues at step 1050, otherwise the method continues at step 1001.

Referring now to FIG. 10, step 1050 is expanded to show internal state information for the purposes of displaying a charging status to the user and optionally of switching internal states to maintain the charge on a fully-charged device. As most steps are duplicative of the above description of FIG. 9, these steps are omitted from this description.

From step 1040, when the polarity check is correct, the charger proceeds to step 1051.

In step 1051, the MCU internally sets its threshold voltage variable to V(th1), which in some embodiments is defined as 4.1V, and proceeds to step 1060.

Step 1060 is the top of a while loop. In step 1060, the voltage detected at the positive pin is compared to the threshold voltage variable. When the detected voltage is greater than the threshold voltage variable, the method proceeds to step 1070, otherwise the method proceeds to step 1080.

In step 1070, the "charge complete" state is entered. To reach step 1070, the battery voltage detected at the positive pin must exceed a threshold voltage. In step 1070, the MCU causes the charger hardware to display a full charge indication, for example by illuminating a charging-state LED in a particular color such as green or in a particular color pattern such as varying the color across the rainbow spectrum. The method then proceeds to step 1071, in which the threshold voltage variable is set to V(th2), which in some embodiments is defined as 3.9V; this sets a lower limit for maintaining the "fully charged" state; if the battery's voltage remains at or above this voltage, the charger will continue to treat the battery as charged, whereas if the battery's voltage drops below this voltage, the charger state will fall back into the charging state. The method then proceeds to step 1091.

In step 1080, the "charging" state continues. To reach step 1080, the battery voltage detected at the positive pin in step 1060 did not exceed a threshold voltage. In step 1080, the MCU causes the charger hardware to display a still-charging indication, for example by illuminating a charging-state LED in a particular color, such as red. The method then proceeds to step 1081, in which the threshold voltage variable is set to V(th1), which in some embodiments is defined as 4.1V. The method then proceeds to step 1091.

In step 1091, the charger tests to see if the device being charged has been unplugged. If the device is still plugged in, the method continues at step 1060, otherwise the method continues at step 1001.

Figure 11:
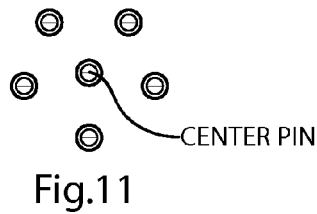
FIG. 11 is a drawing of an arrangement of charging pins.
Figure 12:
FIG. 12 is a drawing of an arrangement of charging pins.
Figure 13:
FIG. 13 is a drawing of an arrangement of charging pins.
Figure 14:
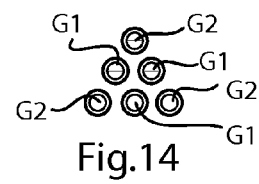
FIG. 14 is a drawing of an arrangement of charging pins.
Figure 15:
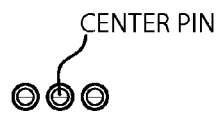
FIG. 15 is a drawing of an arrangement of charging pins.
Figure 16:
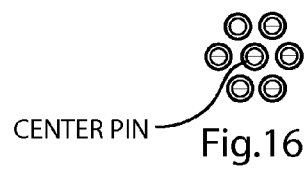
FIG. 16 is a drawing of an arrangement of charging pins.

Please refer now to FIGS. 11 through 16, various layouts of charging pins. FIGS. 11, 13, 15, and 16 each have a center pin. Because such a center pin does not change relative location when in electrical contact with a device to be charged, the center pin cannot be used to detect a trigger pin; the trigger pin on the device to be charged must be arranged to contact any of the other pins in each of these layouts, so that depending on the relative orientation of the device coupled to the charger, the charger may detect the orientation and set its pins' states appropriately. FIG. 14 shows a layout of charging pins that can be considered to be in two different groups; the trigger pin may couple to either group, or two different devices may be designed to have a trigger pin, one device in group one (G1) and the other device in group two (G2) so that the charger may differentiate between charging and/or communications needs depending on which group of charger pins a trigger pin is detected by. FIGS. 11 and 12 have five possible orientations; FIG. 13 has four; FIG. 14 has three; FIG. 15 has two, and FIG. 16 has six. The additional pins may be used for any purpose, for example without limitation for communications with the device while charging, supplying power to the device so it can be used while charging, charging a second battery requiring a different charging voltage within the device, or for any other useful purpose.

Figure 17A:
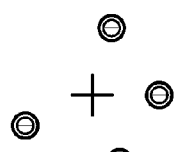
FIG. 17A is a drawing of an arrangement of charging pins.
Figure 17B:
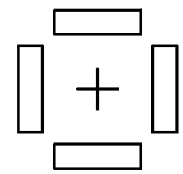
FIG. 17B is a drawing of an arrangement of charging contacts on a device.
Figure 18A:
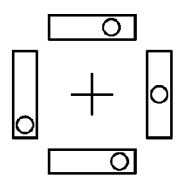
FIGS. 18A-D show the orientations of the charging pins of FIG. 17A contacting the charging contacts on the device of FIG. 17B.
Figure 18B:
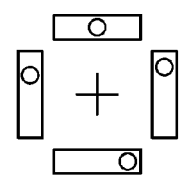
Figure 18C:
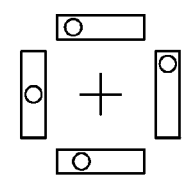
Figure 18D:
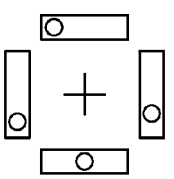

Referring now to FIGS. 17A-B and 18A-D, it should be noted that the charging pins and/or charging contacts do not have to be laid out symmetrically; rather, the issue is that they may be connectable in multiple orientations. FIG. 17A shows four charging pins (with a plus marking the center) laid out asymmetrically, for example because of circuit layout issues. FIG. 17B shows the four charging contacts that these charging pins are meant to rest against when coupled to a device. FIGS. 18A-D show the four possible orientations of the charging pins of FIG. 17A against the charging contacts of FIG. 17B; the pins each properly contact a single charging contact despite the pins' asymmetric arrangement. Either side may be asymmetrically arranged, or indeed both sides may be asymmetrically arranged, so long as multiple connection orientations are possible.

The invention claimed is:

1. A battery charger comprising:
a body,
an electrical connector,
a circuit, and
a plurality of charging pins,
the circuit comprising a microcontroller,
the electrical connector electrically coupled to the circuit,
the body comprising a cavity having a rear surface,
each pin of the plurality of charging pins electrically coupled to the microcontroller,
the plurality of charging pins disposed such that a tip of each charging pin of the plurality of charging pins extend above the rear surface of the cavity,
where the microcontroller sets a state of each charging pin of the plurality of charging pins.

2. The battery charger of claim 1 where the state of each charging pin is selected from the group consisting of a positive pin, a ground pin, a communications pin, a trigger pin, and an unused pin.

3. The battery charger of claim 1 where the microcontroller sets the state of each charging pin of the plurality of charging pins after determining which charging pin of the plurality of charging pins is in electrical contact with a trigger contact of a device.

4. The battery charger of claim 1 where the plurality of charging pins are arranged such that they exhibit approximate rotational symmetry around a point.

5. The battery charger of claim 1 further comprising a first plurality of load switches and a second plurality of load switches, the number of load switches of the first plurality of load switches equal to the number of charging pins of the plurality of charging pins, the number of load switches of the second plurality of load switches equal to the number of charging pins of the plurality of charging pins, where each charging pin of the plurality of charging pins is electrically connected to a load switch of the first plurality of load switches, and each load switch of the first plurality of load switches is electrically connected to a charging pin of the plurality of charging pins, and where each charging pin of the plurality of charging pins is electrically connected to a load switch of the second plurality of load switches, and each load switch of the second plurality of load switches is electrically connected to a charging pin of the plurality of charging pins, and each load switch of the first plurality of load switches is electrically connected to the microcontroller, and each load switch of the second plurality of load switches is electrically connected to the microcontroller; and
where when the circuit is energized, the microcontroller senses a voltage from each charging pin of the plurality of charging pins until a voltage within a voltage range is detected from one charging pin of the plurality of charging pins, whereupon the microcontroller sets the state of each charging pin of the plurality of charging pins according to a predetermined relative layout by enabling a subset of load switches of the first plurality of load switches and the second plurality of load switches.

6. The battery charger of claim 5 further comprising a power-on-reset controller and a third plurality of load switches, where the power-on-reset controller is electrically coupled to the microcontroller, and where each charging pin of the plurality of charging pins is electrically connected to a load switch of the third plurality of load switches, and each load switch of the third plurality of load switches is electrically connected to a charging pin of the plurality of charging pins, and each load switch of the third plurality of load switches is electrically connected to the power-on-reset controller; and where the power-on-reset controller resets the circuit when power is connected to the electrical connector.

* * * * *